United States Patent [19]
Taylor et al.

[11] Patent Number: 6,061,171
[45] Date of Patent: May 9, 2000

[54] OPTICAL AMPLIFIER HAVING A VARIABLE ATTENUATOR CONTROLLED BASED ON INPUT POWER

[75] Inventors: Michael G. Taylor, Laurel; Balakrishnan Sridhar, Elkridge, both of Md.

[73] Assignee: CIENA Corporation, Linthicum, Md.

[21] Appl. No.: 09/083,728

[22] Filed: May 22, 1998

[51] Int. Cl.[7] .............................. H01S 3/10; H04B 10/08; G01J 3/28

[52] U.S. Cl. .......................................... 359/341; 359/337

[58] Field of Search ................................... 359/161, 177, 359/187, 194, 337, 341; 385/27

[56] References Cited

U.S. PATENT DOCUMENTS

| | | | |
|---|---|---|---|
| 4,953,939 | 9/1990 | Epworth ................................. | 359/161 |
| 5,115,338 | 5/1992 | DiGiovanni et al. . | |
| 5,532,864 | 7/1996 | Alexander et al. . | |
| 5,596,448 | 1/1997 | Onaka et al. ........................... | 359/341 |
| 5,696,615 | 12/1997 | Alexander . | |
| 5,812,710 | 9/1998 | Sugaya ................................... | 359/337 |
| 5,818,629 | 10/1998 | Kinoshita ............................... | 359/341 |
| 5,847,863 | 12/1998 | Galvanauskas et al. ................ | 359/333 |
| 5,880,876 | 3/1999 | Kikuchi et al. ........................ | 359/161 |
| 5,917,635 | 6/1999 | Cvijetic et al. ......................... | 359/179 |

FOREIGN PATENT DOCUMENTS

| | | |
|---|---|---|
| 8248455 | 9/1996 | Japan . |
| 9211507 | 8/1997 | Japan . |

OTHER PUBLICATIONS

Giles et al., "Dynamic Gain Equalization in Two–Stage Fiber Amplifiers", IEEE Photonics Technology Letters, vol. 2, No. 12, Dec. 1990, pp. 866–868.

Masuda et al., "Gain Monitoring Of Erbium–Doped Fiber Amplifiers By Detecting Spontaneous Emission", IEEE Photonics Technology Letters, vol. 5, No. 9, Sep. 1993, pp. 1017–1019.

Sugaya et al., "Novel Configuration For Low–Noise And Wide–Dynamic–Range Er–Doped Fiber Amplifier For WDM Systems", OAA'95, Jun. 1995, pp. 158–161.

*Primary Examiner*—Nelson Moskowitz
*Attorney, Agent, or Firm*—David L. Soltz

[57] ABSTRACT

An optical amplifier is disclosed having substantially uniform spectral gain. The amplifier comprises a variable optical attenuator coupled between first and second segments of active optical fiber. The attenuation of the optical attenuator is adjusted in accordance with the optical power input to the amplifier to thereby obtain substantially flattened gain. Alternatively, the attenuator can be controlled based on the respective gains associated with the first and second segments of optical fiber. For example, the attenuator can be adjusted so that so that the sum of the two gains remains substantially constant, a condition that also yields flat spectral gain. Further, optical powers associated with first and second wavelengths of amplified stimulated emission (ASE) light output from the amplifier can be used to adjust the attenuation of the optical attenuator. In an additional example, received optical powers associated with each of the channels in a WDM system are monitored and the attenuators within each amplifier in the system are controlled so that the received powers are substantially equal.

15 Claims, 13 Drawing Sheets

OPTICAL AMPLIFIER HAVING A VARIABLE ATTENUATOR CONTROLLED BASED ON INPUT POWER

BACKGROUND OF THE INVENTION

The present invention is directed toward optical amplifiers having a substantially flat spectral gain.

Wavelength division multiplexing (WDM) has been explored as an approach for increasing the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers do not uniformly amplify light within the spectral region of 1525 to 1580 nm. For example, an optical channel at a wavelength of 1540 nm, for example, is typically amplified 4 dB more than an optical channel at a wavelength of 1555 nm. While such a large variation in gain can be tolerated for a system with only one optical amplifier, it cannot be tolerated for a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical amplifiers providing substantially uniform spectral gain have been developed. In particular, optical amplifiers including an optical filter provided between first and second stages of erbium doped fiber are known to provide gain flatness. In these amplifiers, the first stage is operated in a high gain mode and supplies a low noise signal to the second stage, while the second stage is operated in a high power mode. Although the second stage introduces more noise than the first, the overall noise output by the amplifier is low due to the low noise signal of the first stage. The optical filter selectively attenuates the high gain wavelengths, while passing the low gain wavelengths, so that the gain is substantially equal for each wavelength output from the second stage.

These gain-flattening amplifiers are typically designed to receive optical signals at a particular power level. In the event the total power level of all optical signals input to the amplifier differs from the desired input level, the amplifier can no longer amplify each wavelength with substantially the same amount of gain. Accordingly, the conventional gain-flattened amplifiers discussed above are unable to receive input optical signals over a wide range of power levels while maintaining substantially uniform gain at each wavelength.

SUMMARY OF THE INVENTION

Consistent with an embodiment of the present invention, an optical amplification device is provided, comprising a first segment of active optical fiber having a first end portion coupled to an optical communication path carrying a plurality of optical signals, each at a respective one of a plurality of wavelengths, and a second end portion. The first segment of active optical fiber receives the plurality of optical signals through the first end portion and outputs the plurality of optical signals through said second end portion. An optical attenuator is also provided having an input port receiving the plurality of optical signals coupled to the second end portion of the first segment of optical fiber. The optical attenuator further includes a control port that receives an attenuation control signal, and an output port.

In addition, the optical amplification device comprises a second segment of active optical fiber having a first end portion coupled to the output port of the optical attenuator and a second end portion. The plurality of optical signals propagate through the optical attenuator and are supplied to the first end portion of the second segment of active optical fiber via the output port of said optical attenuator. The plurality of optical signals are next output from the second segment of active optical fiber via the second end portion of the second segment of active optical fiber.

A control circuit is further provided which is configured to be coupled to the optical communication path. The control circuit senses an optical power of at least one of said plurality of optical signals, and outputs the attenuation control signal in response to the sensed optical power. The optical attenuator, in turn, attenuates the plurality of optical signals in response to the attenuation control signal such that a power associated with each of said plurality of optical signals output from the second end portion of the second segment of active optical fiber is substantially the same.

In accordance with an additional embodiment of the present invention, the attenuation of the optical attenuator is controlled in accordance with the respective gains of the first and second segments of active optical fiber. For example, the attenuation is adjusted so that the sum of the gains of the two segments of active optical fiber remains constant.

In a further embodiment of the present invention, optical powers associated with amplified stimulated emission light at a first and second wavelengths is compared, and the attenuation of the optical attenuator is adjusted so that these optical powers are substantially equal.

Moreover, in accordance with an additional embodiment of the present invention, received power of each of a plurality of WDM signals is measured after propagation through a chain of amplifiers, each of which including first and second segments of active optical fiber and an optical attenuator coupled between the two. Based on the received power, the attenuation of the optical attenuator in each amplifier is adjusted so that the received power associated with each WDM signal is substantially the same.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
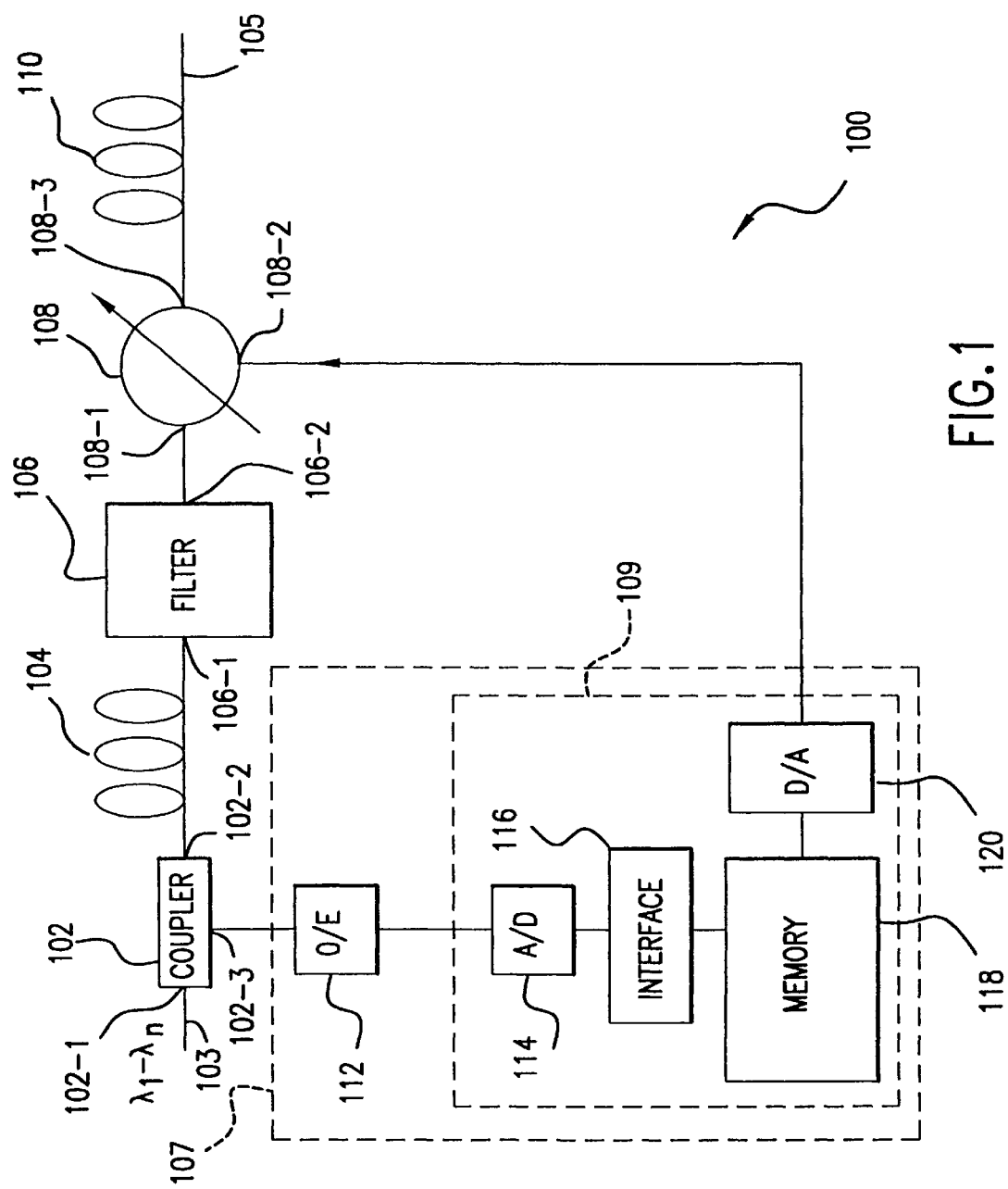
FIG. 1 illustrates an optical amplifier in accordance with a first embodiment of the present invention.

Turning to the drawings in which like reference characters indicate the same or similar elements in each of the several views, FIG. 1 illustrates an amplifier 100 in accordance with a first embodiment of the present invention. Optical amplifier 100 includes a known coupler 102 having an input port 102-1 receiving a plurality of optical signals, each at a respective one of wavelengths $\lambda_1$ to $\lambda_n$ typically within a range of 1500 to 1590 nm. The plurality of optical signals, which can constitute WDM signals, are carried by an optical fiber 103. Coupler 102 can constitute a conventional optical tap or splitter, which supplies each of the plurality of optical signals to both outputs 102-2 and 102-3. The power of optical signals at output 102-2 is typically significantly more than the power of optical signals supplied from output 102-3. For example, the power at output 102-3 can be approximately 2% of the power fed to input 102-1, while the power at output 102-2 can be approximately 98% of the power supplied to input 102-1 (neglecting coupler loss, for simplicity).

The optical signals output from coupler 102 are next supplied to a first segment of active optical fiber 104, which provides a first stage of amplification. Active optical fiber 104 is typically doped with a fluorescent material, such as erbium, and pumped with light at a wavelength different than the amplified optical signals, e.g., 980 nm. A pump laser (not shown) is typically coupled to active optical fiber 104 in a known manner to excite the fluorescent material. The pump light is of sufficient magnitude and the composition of active optical fiber 104 is such that the optical signals output from coupler 102 are amplified with high gain, but with relatively little noise.

The optical signals are next supplied to an input port 106-1 of filter 106 via an isolator (not shown). Filter 106, commercially available from JDS Fitel, for example, selectively attenuates certain optical signal wavelengths, e.g., the high gain wavelengths output from first segment of active optical fiber 104, while permitting other wavelengths to pass substantially unattenuated. The optical signals, some of which being attenuated, next pass via filter output port 106-2 to input port 108-1 of optical attenuator 108.

Optical attenuator 108 has an attenuation which can be variably controlled in accordance with an attenuation control signal supplied to control port 108-2. Optical attenuator 108, which is commercially available from JDS Fitel and E-Tek, for example, attenuates each of the optical signals by substantially the same amount, and as discussed in greater detail, controllably attenuates the optical signals so that amplifier 100 provides substantially uniform gain for each of the optical signals.

The optical signals are then supplied via output port 108-3 of attenuator 108 to a second segment of active optical fiber 110, which provides a second stage of amplification. Second segment of active optical fiber 110 is typically pumped with light from a laser (not shown) at a wavelength, e.g., 1480 nm, which is different than the optical signal wavelengths $\lambda_1$ to $\lambda_n$. In addition, second segment of active optical fiber 110 is pumped in such a manner and has an appropriate composition that yields a high power output to fiber 105.

As further shown in FIG. 1, optical signal output from port 102-3 of coupler 102 are supplied to a control circuit 107 including a known photodetector 112, which converts the optical signals to an electrical signal, and an attenuator adjustment circuit 109 comprising analog-to-digital converter 114, interface circuit 116, memory circuit 118 and digital-to-analog circuit 120. The electrical signal is supplied to a known analog-to-digital converter circuit 114, which converts the received electrical signal, typically in analog form, to a digital signal. An interface circuit 116, including for example a decoder, couples the digital signal to a known memory circuit 118, such as an EPROM. Other circuitry may be provided between photodetector 112 and memory circuit 118, as necessary, for example, voltage level adjustment circuits. Memory circuit 118 can constitute a look-up table, which stores power values, as represented by the digital signal, and corresponding attenuator adjustment values. Accordingly, in response to the output from interface circuit 116, memory circuit 118 outputs an associated attenuator adjustment value corresponding to a substantially flat amplifier gain spectrum. The attenuator adjustment value is supplied to digital-to-analog converter circuit 120, which, in turn, feeds an attenuation control signal to control port 108-2 of attenuator 108, to appropriately adjust the attenuation thereof. Other circuitry may be provided between memory circuit 118 and attenuator 108, as necessary, e.g., for voltage level adjustment etc.

Thus, variations in input power to amplifier 100 at input port 102-1 of coupler 102 can be offset by corresponding changes in the attenuation of optical attenuator 108 so that optical amplifier 100 maintains a substantially uniform gain spectrum.

Figure 2:
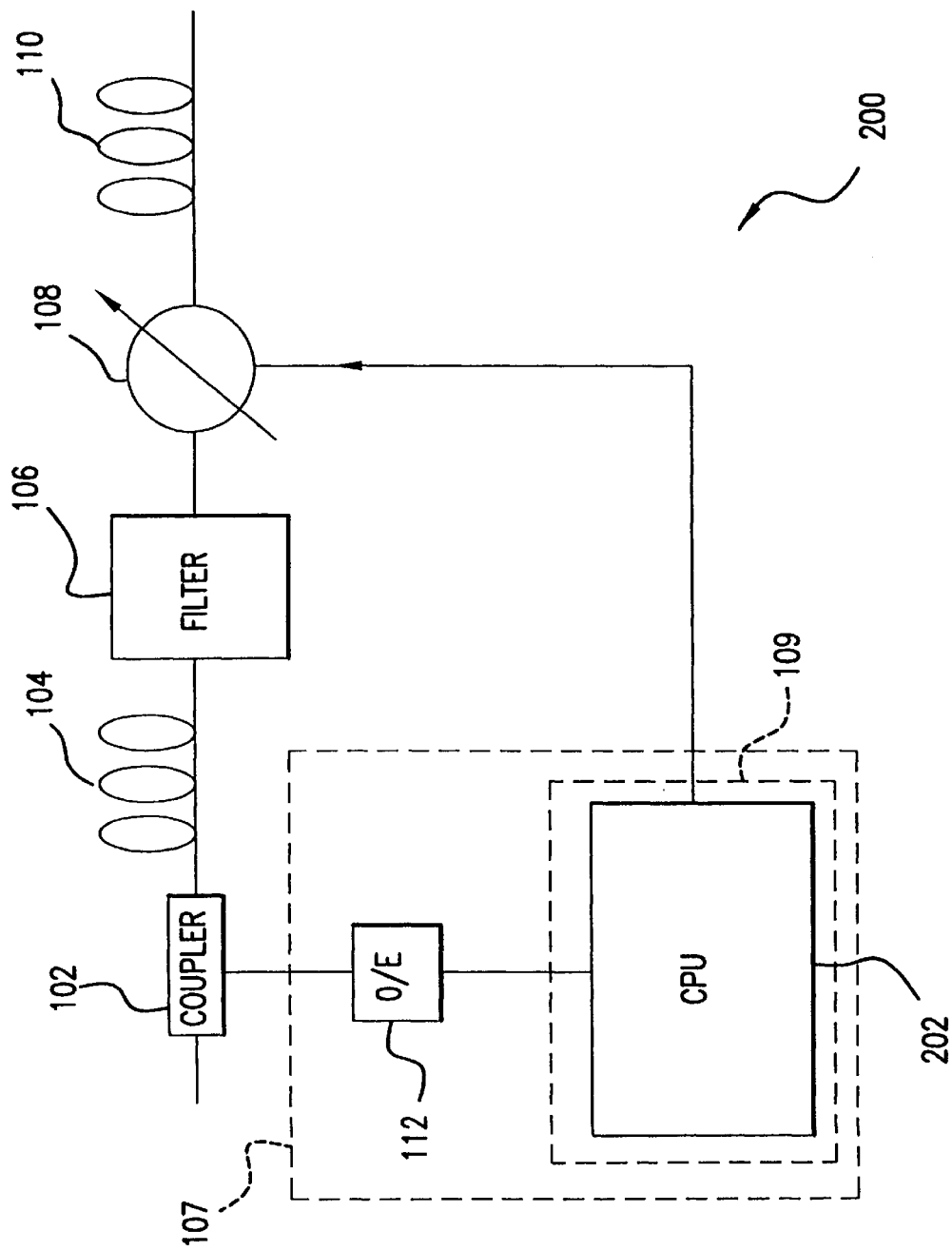
FIG. 2 illustrates an optical amplifier in accordance with a second embodiment of the present invention.

FIG. 2 illustrates an amplifier 200 in accordance with an additional embodiment of the present invention. Optical amplifier 200 is similar to amplifier 100 shown in FIG. 1, with the exception that attenuator adjustment circuit 109 comprises a conventional microprocessor or central processing unit (CPU) 202, which receives the electrical signal output from photodetector 112 and calculates an appropriate attenuator adjustment value required for amplifier gain flatness in response thereto. CPU 202 further outputs an attenuation control signal in accordance with the attenuator adjustment value so that amplifier 200 maintains substantially uniform spectral gain.

Figure 3:
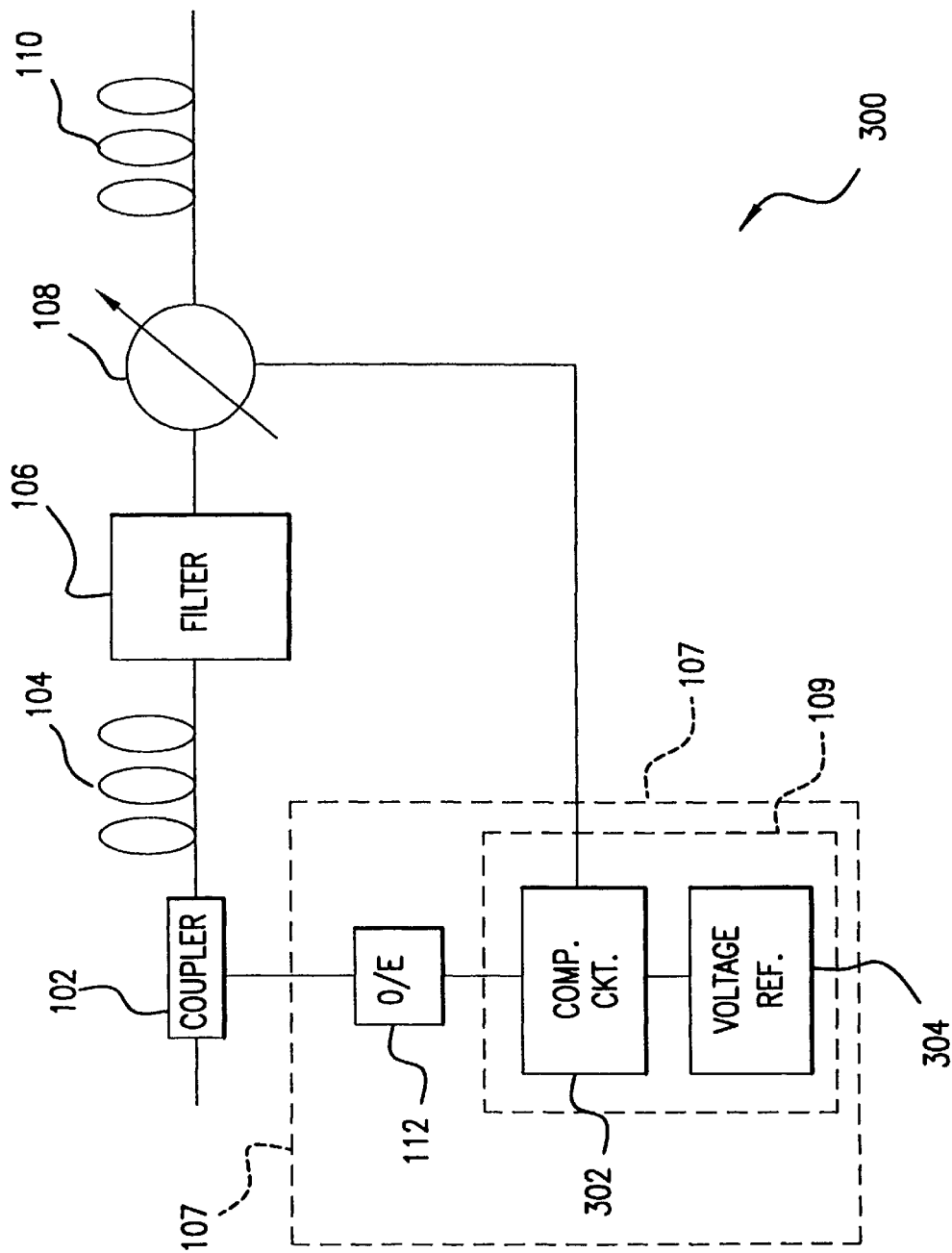
FIG. 3 illustrates an optical amplifier in accordance with a third embodiment of the present invention.

FIG. 3 illustrates amplifier 300 in accordance with an alternative embodiment of the present invention. Amplifier 300 is similar to amplifier 100 but attenuator adjustment circuit 109 comprises a comparator circuit 302 and predetermined electrical signal source or voltage reference 304. In effect, attenuator adjustment circuit 109 compares a power associated with the plurality of optical signals input to coupler 102 with a predetermined power value, as represented by an appropriate voltage output from voltage reference 304, and outputs the attenuation control signal in response to this comparison. Alternatively, a suitable comparator circuit 302 could be coupled to interface circuit 116 and a memory circuit, such as memory circuit 118 or a register, storing the predetermined power value. In which case, the comparator circuit would output the attenuation control signal in response to a comparison of the input power value and the predetermined power value stored in the memory circuit. The attenuation control signal output from comparator circuit 302 adjusts the attenuation of attenuator 108 so that amplifier 300 has substantially flat spectral gain.

Figure 4:
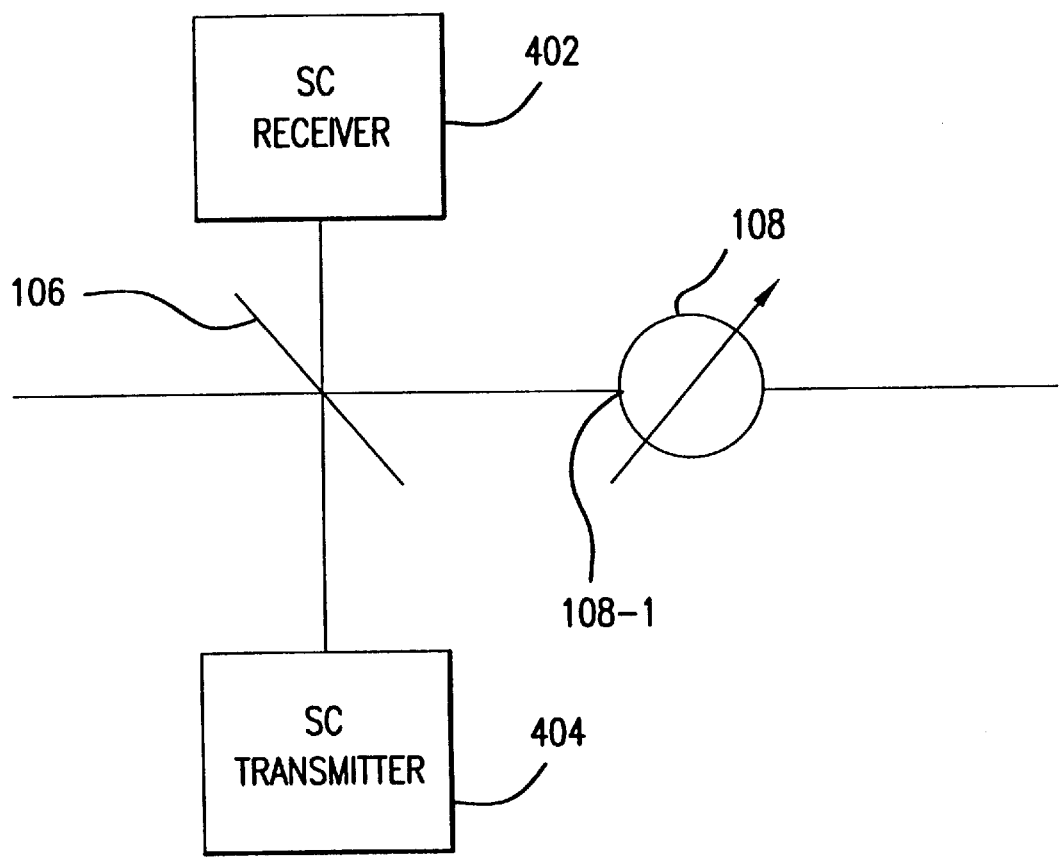
FIG. 4 illustrates a service channel add/drop configuration in accordance with an aspect of the present invention.

FIG. 4 illustrates a feature of the present invention, whereby a service or monitoring channel signals, having a wavelength typically lying outside the range of wavelengths (e.g., 1500 nm–1590 nm) of optical signals input to coupler 102, can be inserted and extracted from amplifiers 100, 200, and 300, as discussed, for example, in U.S. Pat. No. 5,532, 864, incorporated by reference herein. Filter 106, reflects the received service channel signals, typically having a wavelength of 1625–1650 nm, to service channel receiver 402, and directs the service channel signal emitted by service channel transmitter 404 to input port 108-1 of attenuator 108. The service channel add/drop configuration shown in FIG. 4 can also be incorporated into the amplifier shown in FIGS. 5, 8, 9 and 12, discussed in greater detail below. It is noted that filter 106 can serve both purposes of adding/dropping the service channel, as well as selectively attenuating the high gain wavelength i.e., for gain flattening. Alternatively, separate filters can be provided for service channel add/drop and gain flattening, respectively.

Figure 5:
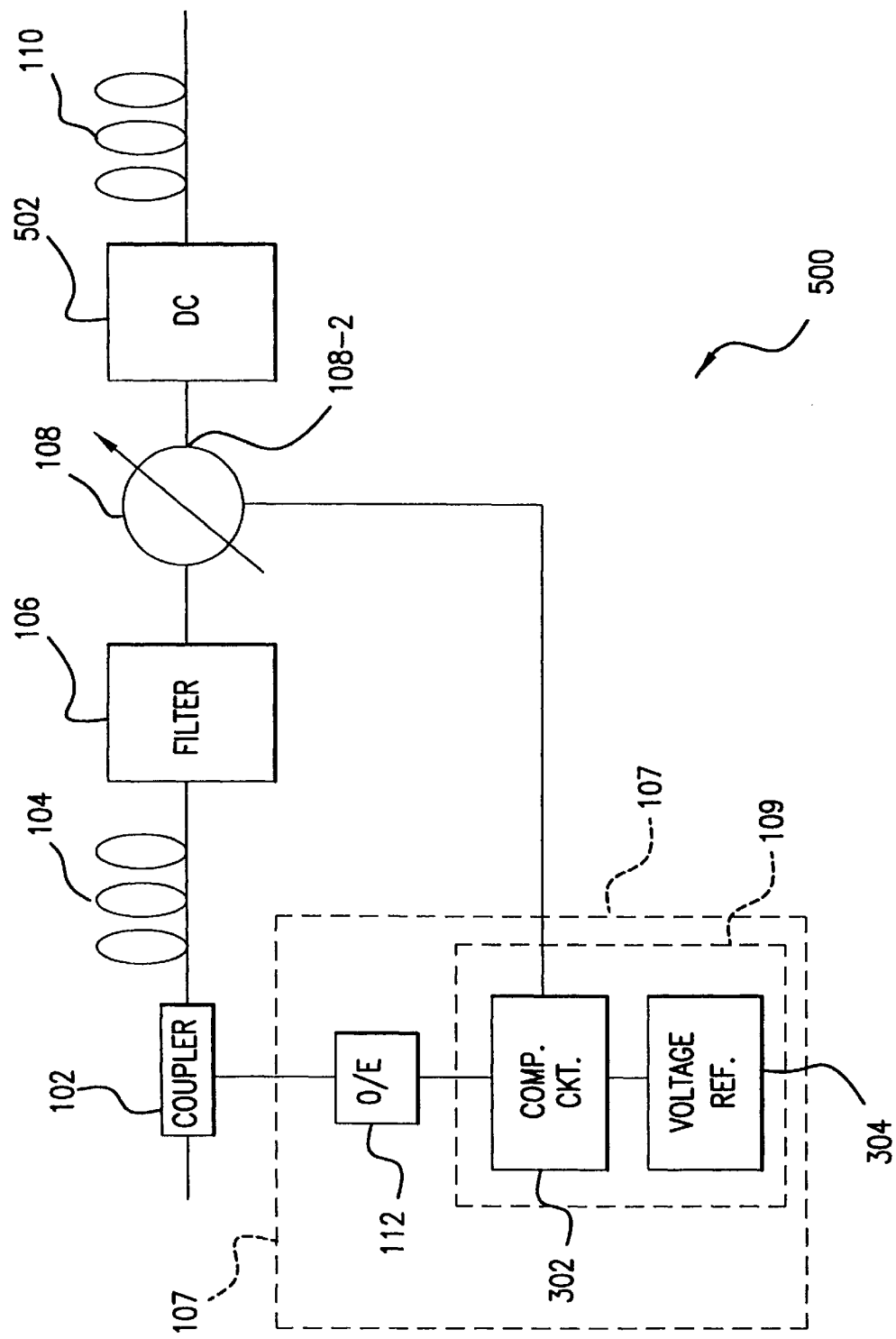
FIG. 5 illustrates an optical amplifier in accordance with a fourth embodiment of the present invention.

FIG. 5 illustrates an alternative amplifier 500 in accordance with the present invention similar to amplifier 300 shown in FIG. 3. Amplifier 500, however, further comprises a dispersion compensating element 502 coupled between output port 108-2 of optical attenuator 502 and second segment of active optical fiber 110. Dispersion compensating element 502 provides dispersion compensation for the optical signals output from attenuator 108, and can include either a known dispersion compensating fiber (DCF) or dispersion compensating Bragg grating. It is noted that dispersion compensating element can be provided at any appropriate location within any one of the embodiments of the present invention, e.g., amplifiers 100, 200, 300, and the amplifiers shown in FIGS. 6, 8 and 9.

Figure 6:
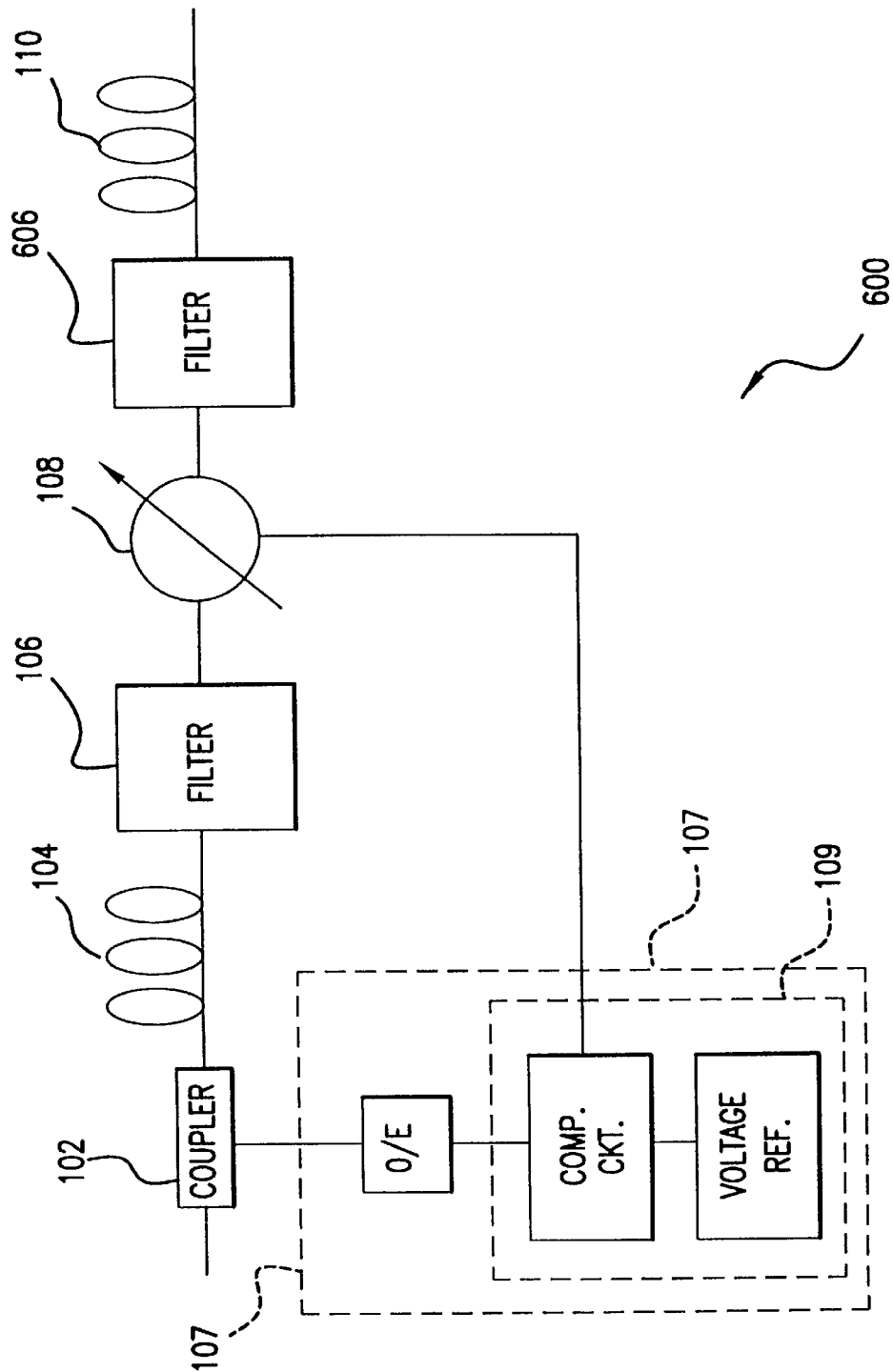
FIG. 6 illustrates an optical amplifier in accordance with a fifth embodiment of the present invention.

FIG. 6 illustrates amplifier 600 in accordance with a further embodiment of the present invention. Amplifier 600 is similar to amplifier 300 discussed above, but includes an additional filter 606. In this embodiment, filter 106 typically attenuates one group of wavelengths, while filter 606 attenuates another group in order to provide gain flattening. Alternatively, as further shown in FIG. 7, filter 106 can be used to direct first service channel signals to service channel receiver 402, while filter 606 can be used to couple second service channel signals emitted by service channel transmitter 404 to second segment of active optical fiber 110 for output from amplifier 600. An additional filter can also be provided in FIG. 7 to provide spectral filtering of the high gain wavelengths to obtain flattened gain. Alternatively, filters 106 and 606 can be provided which both selectively attenuate the high gain wavelengths and perform the service channel add or drop.

Figure 7:
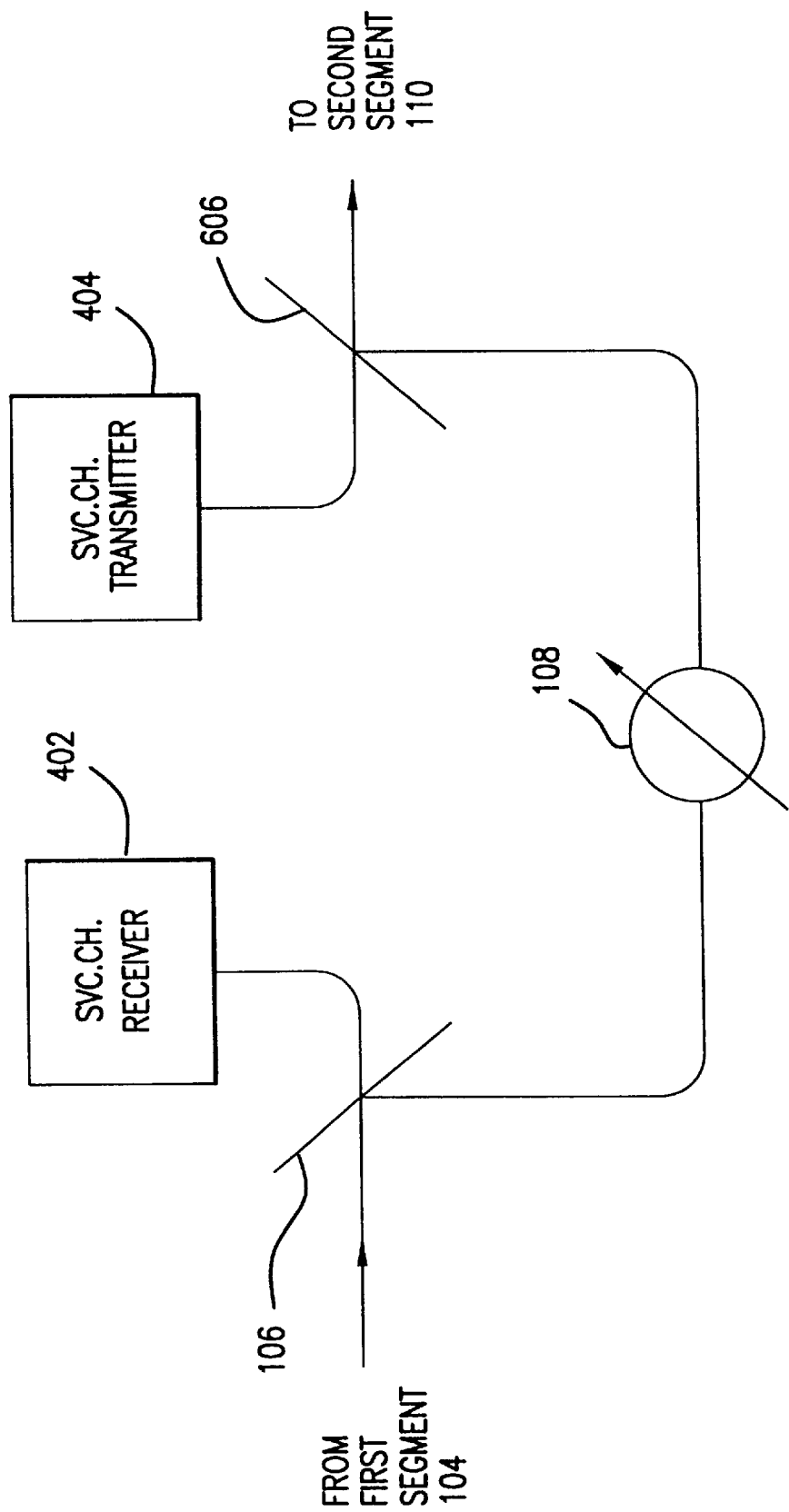
FIG. 7 illustrates an additional service channel add/drop configuration in accordance with an aspect of the present invention.

The embodiment shown in FIG. 7 may be advantageous in having reduced cross-talk between the added and dropped service channel signals compared to the add/drop configuration shown in FIG. 4. In particular, the add/drop configuration shown in FIG. 4 includes a single filter 106 for both adding and dropping the service channel signals. Typically, filter 106, however, is not entirely reflective at the service channel wavelength. Accordingly, a portion of the second service channel signals emitted by service channel transmitter 404 in FIG. 4 can pass through filter 106 to service channel receiver 402, thereby resulting in cross-talk or interference between the received service channel signal and the portion of the service channel signal emitted by service channel transmitter 404.

In FIG. 7, the service channel signals are dropped and added with separate filters. Accordingly, any portion of the service channel signals emitted by service channel transmitter 404 that propagates toward attenuator 108, and not to second segment of active optical fiber 110, as intended, are significantly attenuated by attenuator 108, thereby effectively eliminating any cross-talk at receiver 402. The add/drop configuration shown in FIG. 7 may be incorporated into all the amplifiers discussed above, as well as those shown in FIGS. 8, 9 and 12 below.

Figure 8:
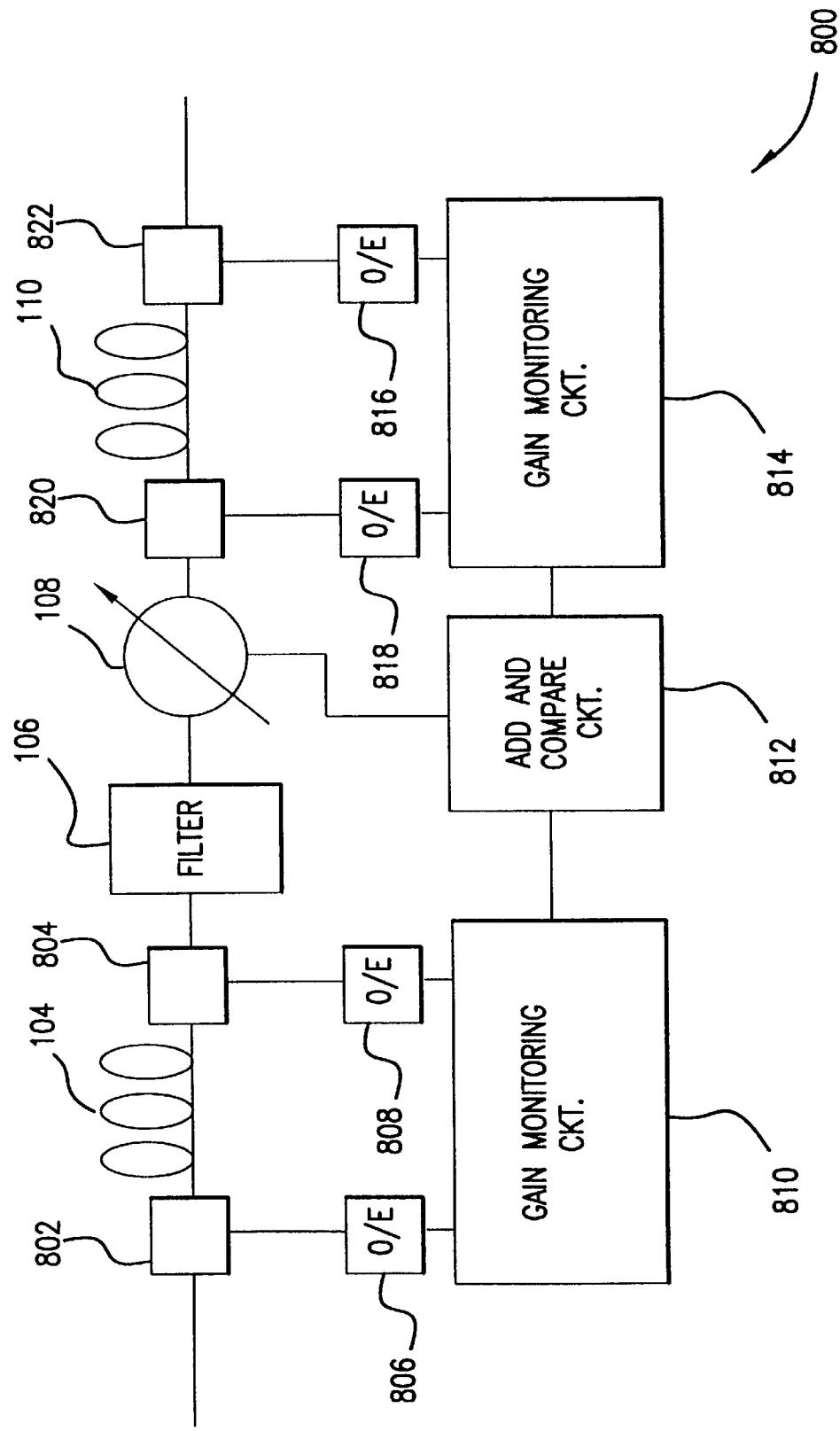
FIG. 8 illustrates an optical amplifier in accordance with a sixth embodiment of the present invention.

FIG. 8 illustrates amplifier 800 in accordance with another embodiment of the present invention. In FIG. 8, the gains of first and second segments of active optical fiber 104 and 110 are determined, and adjusted by varying the attenuation of optical attenuator 108, so that the sum (or difference) of the two remains at a substantially constant value corresponding to a uniform spectral gain. For example, coupler 802 taps a portion of the power of the optical signals input to first segment of active optical fiber 104 to photodetector 806, while coupler 804 taps a portion of the power of the optical signals output from fiber 104 to photodetector 808. Photodetectors 806 and 808, in turn, output first and second electrical signals to a first gain monitoring circuit 810. Appropriate processing of the received first and second electrical signals is performed within gain monitoring circuit 810, and a known dividing circuit, provided in gain monitoring circuit 810, divides a first power value corresponding to the power output from fiber 104 by a second power value corresponding to the power input to fiber 104. The resulting quotient is the gain associated with first segment of active optical fiber 104. Gain monitoring circuit 810 then outputs to a regulator circuit, such as add and compare circuit 812, a first gain signal in accordance with the gain associated with fiber 104.

As further shown in FIG. 8, coupler 820 taps a portion of the power of the optical signals input to second segment of active optical fiber 110, and coupler 822 taps a portion of the power of the optical signal output from fiber 110. Photodetectors 818 and 816 respectively receive the optical outputs of couplers 820 and 822, and generate corresponding third and fourth electrical signals in response thereto. The third and fourth electrical signals are fed to a second gain monitoring circuit 814, which appropriately processes these signals to obtain third and fourth power values corresponding to the power input and output from fiber 110. A known dividing circuit within gain monitoring circuit 814 divides the fourth power value by the third power value. The resulting quotient thus corresponds to the gain associated with second segment of active optical fiber 110. Based on this quotient, a second gain signal is output to add and compare circuit 812.

After receiving the first and second gain signals, add and compare circuit 812 typically adds the two signals and compares the sum with a predetermined sum corresponding to a substantially flat gain condition of the amplifier. As a result of the comparison, an attenuation control signal is supplied to attenuator 108 so that the sum of the first and second gain signals is adjusted to substantially equal the predetermined sum. At which point, amplifier 800 has substantially uniform gain.

Figure 9:
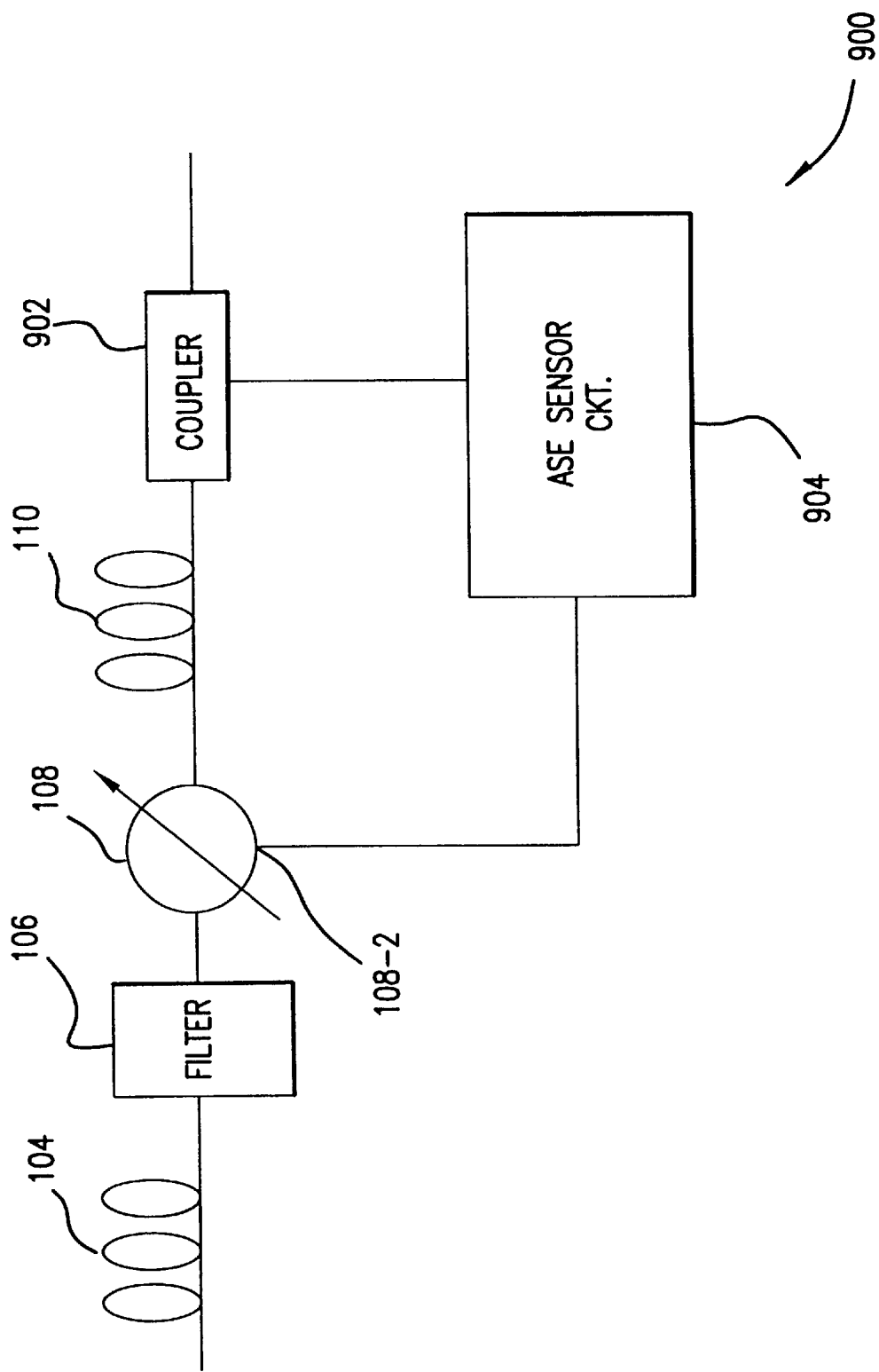
FIG. 9 illustrates an optical amplifier in accordance with a seventh embodiment of the present invention.

FIG. 9 illustrates a further embodiment of the present invention in which attenuator 108 is controlled in accordance with power levels of amplified stimulated emission (ASE) light output from amplifier 900. Amplifier 900 comprises, for example, a coupler 902 that taps optical signals output from second segment of optical fiber 110. The optical signals are fed to ASE sensor circuit 904, which, in turn, detects the optical power associated with first and second wavelengths of the ASE light. ASE sensor circuit then outputs an attenuation control signal to control port 108-2 of attenuator 108 to adjust the attenuation thereof so that the optical powers associated with the two wavelengths of ASE light are substantially the same. At this point, amplifier 900 has substantially uniform spectral gain.

Figure 10:
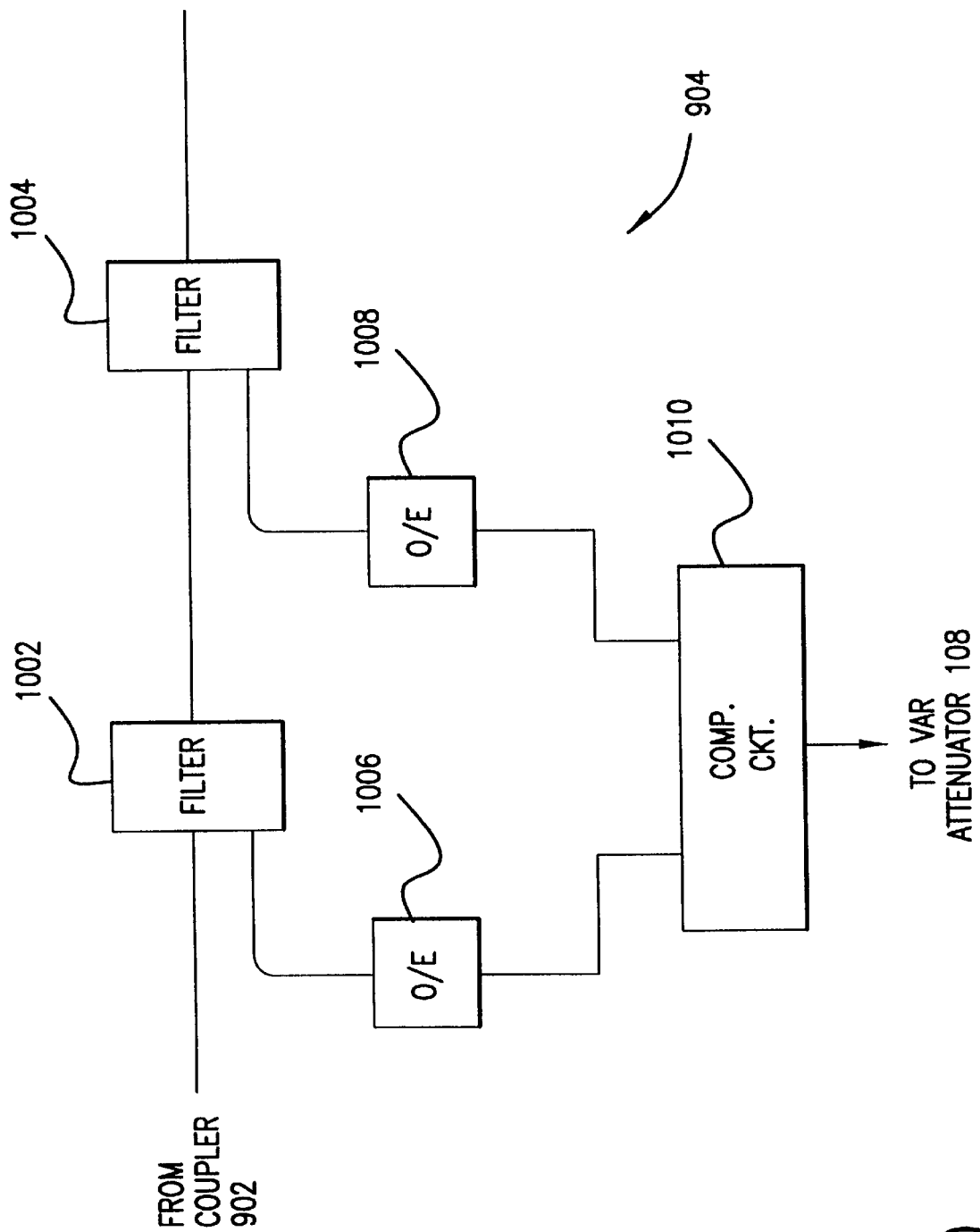
FIG. 10 illustrates an ASE sensor circuit in accordance with a further aspect of the present invention.
Figure 11:
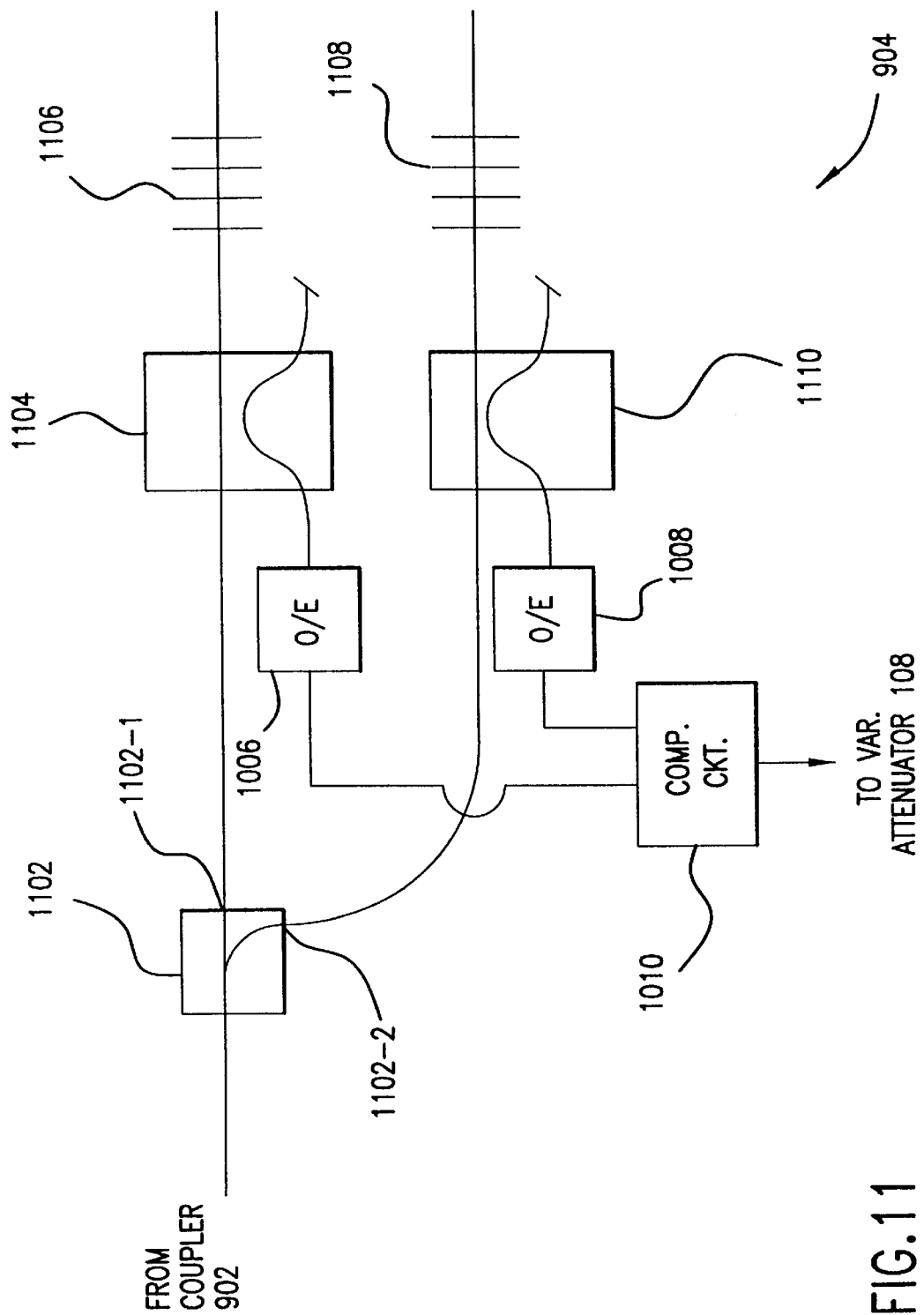
FIG. 11 illustrates an ASE sensor circuit in accordance with an additional aspect of the present invention.

FIGS. 10 and 11 illustrate examples of ASE sensor circuit 904 comprising different optical demultiplexers. In the first example shown in FIG. 10, ASE sensor circuit 904 includes an optical demultiplexer comprising first 1002 and second 1004 filters, commercially available from JDS Fitel, for example, which receive light from coupler 902 and reflect a corresponding one of the ASE wavelengths, while transmitting other wavelengths. Photodetectors 1006 and 1008, respectively coupled to filters 1002 and 1004, output electrical signals in response to the received ASE light to comparator circuit 1010. Comparator circuit 1010, in turn, supplies the attenuation control signal to attenuator 108 to substantially equalize the power associated with the first and second ASE wavelengths, thereby flattening the gain of amplifier 900.

In FIG. 11, ASE sensor circuit 904 includes an optical demultiplexer comprising splitter 1102, couplers 1104 and 1110 and in-fiber Bragg gratings 1106 and 1108. Optical splitter 1102 outputs light tapped from coupler 902 through outputs 1102-1 and 1102-2. A portion of the tapped light supplied through port 1102-1 passes through a first coupler 1104 to in-fiber Bragg grating 1106. In-fiber Bragg grating 1106 is configured to reflect light primarily at the first ASE wavelength, for example. Accordingly, the first ASE wavelength light is reflected back to coupler 1104, which directs the light to photodetector 1006. In a similar fashion, another portion of the tapped light from coupler 902 is fed to in-fiber Bragg grating 1108 via coupler 1110 and output 1102-2 of splitter 1102. In fiber Bragg grating 1108 typically reflects a substantial portion of the ASE light at the second wavelength. Thus, the ASE second wavelength light is reflected back to coupler 110, which directs the light to photodetector 1008. Photodetectors 1006 and 1008, as discussed above, output electrical signals to comparator circuit 1010 in response to the received ASE light. Based on these electrical signals, comparator circuit 1010 next outputs an appropriate attenuation control signal to adjust the attenuation of attenuator 108 so that the received power of the ASE light at the first and second wavelength is substantially the same. In which case, amplifier 900 has substantially flattened gain.

Figure 13:
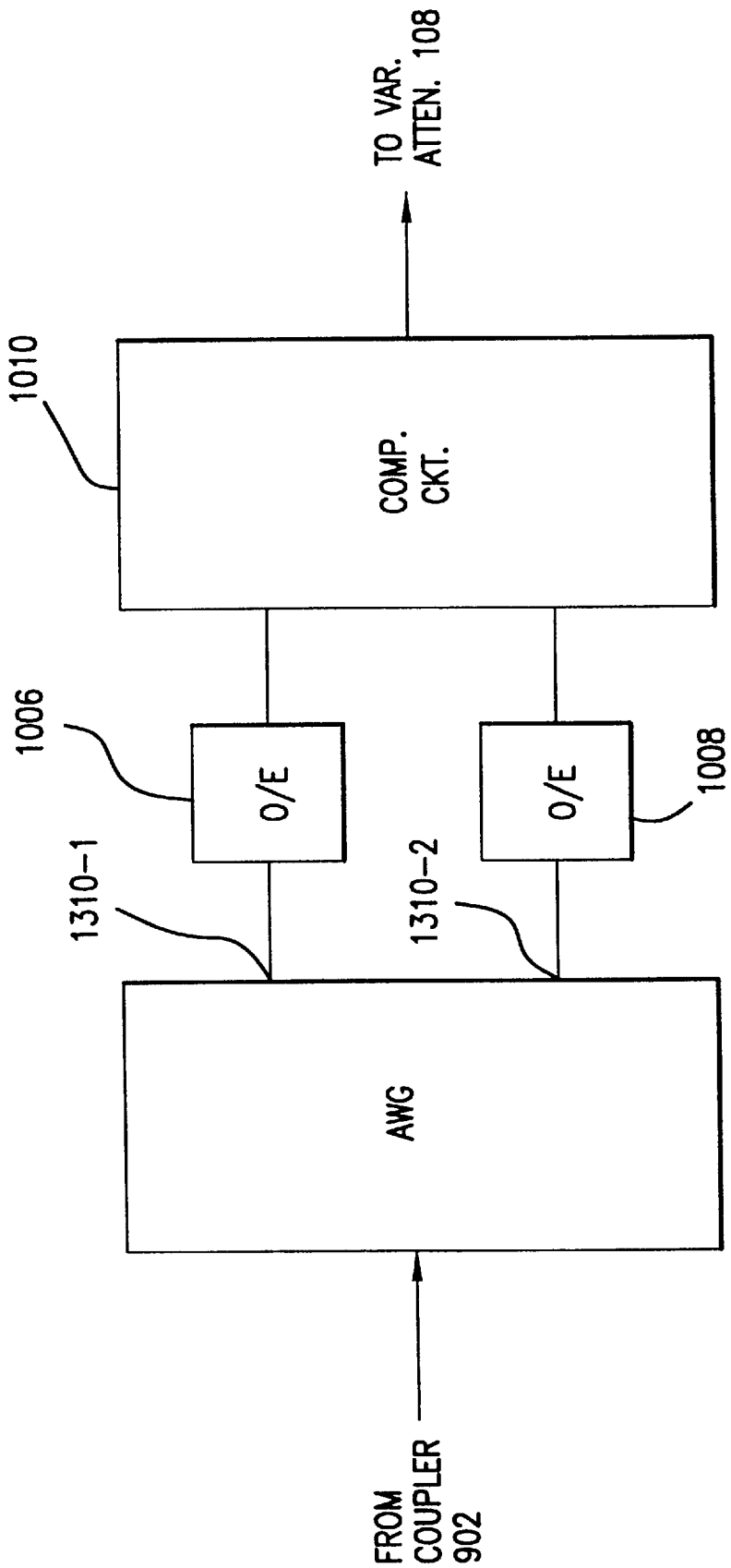
FIG. 13 illustrates an additional ASE sensor circuit.

Although optical demultiplexers comprising in-fiber Bragg gratings and filters are described above, arrayed waveguide gratings (AWGs) or other suitable optical demultiplexers can be incorporated into ASE sensor circuit 904. For example, as seen in FIG. 13, AWG 1310 outputs the ASE light at the first and second wavelengths through outputs 1310-1 and 1310-2, respectively. The ASE light is supplied to photodetectors 1006 and 1008, which operate in conjunction with comparator circuit 1010 in a manner similar to that described above to output an attenuation control signal to attenuator 108.

Figure 12:
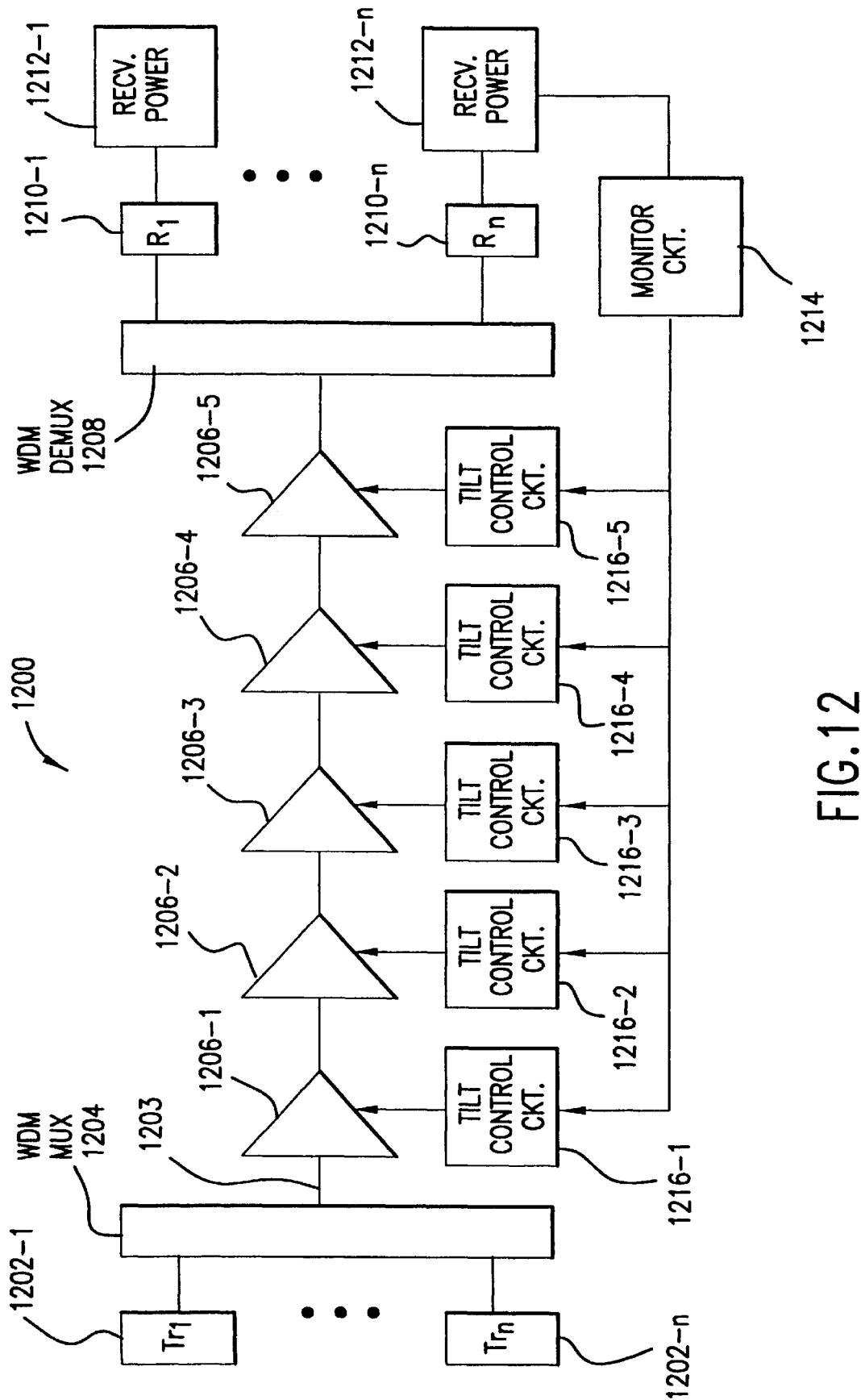
FIG. 12 illustrates a block level diagram of an optical communication system in accordance with the present invention.

FIG. 12 illustrates an alternative embodiment of the present invention in which the attenuators included in a chain of amplifiers are adjusted substantially simultaneously so that the power associated with each optical signal output from the chain is substantially the same. In particular, FIG. 12 illustrates a WDM system 1200 comprising a plurality of transmitters $Tr_1$ to $Tr_n$ (1202-1 to 1202-n) each of which emitting one of a plurality of optical signals. Each of the plurality of optical signals are at a respective one of a plurality of wavelengths. The optical signals are output to and combined, using a conventional WDM multiplexer 1204, onto an optical communication path 1203, comprising, for example, an optical fiber. A chain of optical amplifiers 1206-1 to 1206-5 are coupled in series along optical communication path 1203. The optical amplifiers can have a structure similar to that of any one of optical amplifiers discussed above, including an optical attenuator coupled between first and second segments of active optical fiber. A WDM demultiplexer 1208 is coupled to optical communication path 1203 at the end of the amplifier chain. Each of the outputs of WDM demultiplexer 1208 are coupled to a respective one of receivers 1210-1 to 1210-n, which convert the optical signals to corresponding electrical signals. Received power modules 1212-1 to 1212-n sense these electrical signals and determine the received optical power and/or signal to noise ratio associated with each optical signal. The received power modules supply power level signals corresponding to the received optical powers to monitor circuit 1214, which determines whether the received power levels are substantially equal. If not, monitor circuit 1214 outputs an adjustment signal to tilt control circuits 1216-1 to 1216-5. In response to the adjustment signal, each of tilt control circuits 1216-1 to 1216-5 outputs a corresponding attenuation control signal to the attenuators in amplifiers 1206-1 to 1206-5, thereby adjusting the output powers of the optical signals supplied from each of these amplifiers. Received power modules, in turn, detect the new optical power levels and supply new power level signals to monitor circuit 1214. Monitor circuit 1214 typically continues to output adjustment signals to tilt control circuits 1216-1 to 1216-5, thereby maintaining substantially equal power levels for each optical signal.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical amplifier, comprising:

an optical coupler having an input port, and first and second output ports, said input port being configured to be coupled to an optical communication path carrying a plurality of optical signals, each at a respective wavelength, said optical communication path having a first length;

a first stage having a first segment of active optical fiber having a first end portion coupled to said first output port of said optical coupler, and a second end portion, said first segment of active optical fiber receiving said plurality of optical signals through said first end portion and outputting said plurality of optical signals through said second end portion;

an optical attenuator having an input port coupled to said second end portion of said first segment of optical fiber, said optical attenuator having a control port that receives an attenuation control signal, and an output port, said input port of said optical attenuator receiving said plurality of optical signals, a first intermediate optical path coupling said input port of said optical attenuator to said second end portion of said first segment of optical fiber;

a second stage having a second segment of active optical fiber having a first end portion coupled to said output port of said optical attenuator and a second end portion, said plurality of optical signals propagating through said optical attenuator and being supplied to said first end portion of said second segment of active optical fiber via said output port of said optical attenuator, said plurality of optical signals being output from said second segment of active optical fiber via said second end portion of said second segment of active optical fiber, a second intermediate optical path coupling said output port of said optical attenuator to said first end portion of said second segment of active optical fiber, lengths associated with said first and second intermediate optical paths being less than a length of said optical communication path;

a photodetector coupled to said second output port of said coupler, said photodetector sensing a portion of said plurality of optical signals and generating an electrical signal in response thereto; and an attenuator adjustment circuit coupled to said photodetector and said control port of said optical attenuator, said attenuator adjustment circuit outputting said attenuation control signal in response to said electrical signal, said optical attenuator attenuating said plurality of optical signals in response to said attenuation control signal such that a power associated with each of said plurality of optical signals output from said second end portion of said second segment of active optical fiber is substantially the same.

2. An optical amplification device in accordance with claim 1, wherein said attenuator adjustment circuit comprises:

a memory circuit coupled to said photodetector, said memory circuit outputting an attenuator adjustment value in response to said electrical signal, said attenuator adjustment circuit outputting said attenuation control signal in accordance with said attenuator adjustment value.

3. An optical amplification device in accordance with claim 1, wherein said attenuator adjustment circuit comprises:

a comparator circuit having a first input coupled to said photodetector, to thereby receive said electrical signal, and a second input; and a predetermined electrical signal source, said predetermined electrical signal source supplying a predetermined electrical signal to said second input of said comparator, said comparator generating said attenuation control signal based on said electrical signal and said predetermined electrical signal.

4. An optical amplification device in accordance with claim 1, further comprising an optical filter having an input port coupled to said second end portion of said first segment of active optical fiber and an output port coupled to said input port of said optical attenuator.

5. An optical amplification device in accordance with claim 4, wherein said optical filter comprises an additional input port and an additional output port, said optical amplification device further comprising:

a service channel transmitter coupled to said additional input port of said optical filter, said service channel transmitter supplying first optical service signals at a wavelength different than said plurality of optical signals to said additional input port of said optical filter, said first optical service signals being output through said output port of said optical filter to said input port of said optical attenuator; and a service channel receiver coupled to said additional output port of said optical filter, said service channel receiver sensing second optical service signals output from said additional output port of said optical filter.

6. An optical amplification device in accordance with claim 1, further comprising:

a first optical filter having an input port coupled to said second end portion of said first segment of active optical fiber and an output port coupled to said input port of said optical attenuator; and a second optical filter having an input port coupled to said output port of said optical attenuator and an output port coupled to said fist end portion of said second segment of active optical fiber.

7. An optical amplification device in accordance with claim 6, wherein said first optical filter includes an additional output port and said second optical filter includes an additional input port, said optical amplification device further comprising:

a service channel receiver coupled to said additional output port of said first optical filter, said service channel receiver sensing first optical service signals output from said additional output port of said first optical filter, said first optical service signals being at a wavelength different than said plurality of optical signals; and a service channel transmitter coupled to said additional input port of said second optical filter, said first optical service signals being output through said output port of said second optical filter to said first end portion of said second segment of active optical fiber.

8. An optical amplification device in accordance with claim 1, further comprising:

an optical filter coupled between said first and second segments of active optical fiber; and a dispersion compensating element provided between said first and second segments of active optical fiber.

9. An optical amplification device in accordance with claim 8, wherein said dispersion compensating element comprises dispersion compensating fiber.

10. An optical amplification device in accordance with claim 8, wherein said dispersion compensating element comprises a dispersion compensating Bragg grating.

11. A method for controlling an optical amplifier, said optical amplifier being configured to be coupled to an optical communication path having a first length, said optical amplifier comprising first and second segments of active optical fiber coupled in series by an intermediate optical path having a second length less than said first length, and an optical attenuator coupled between said first and second segments of active optical fiber, said method comprising the steps of:

supplying a plurality of optical signals to said first segment of active optical fiber, each of said plurality of optical signals being at a respective one of a plurality of wavelengths;

measuring an input optical power associated with at least one of said plurality of optical signals supplied to said first segment of active optical fiber;

outputting said plurality of optical signals via said optical attenuator and said second segment of active optical fiber;

adjusting an attenuation of said optical attenuator based on said input optical power such that an output power associated with each of said plurality of optical signals output from said optical amplifier is substantially the same.

12. A method for controlling an optical amplifier, said optical amplifier being configured to be coupled to an optical communication path having a first length, said optical amplifier comprising first and second segments of active optical fiber coupled in series by an intermediate optical path having second length less than said first length, and an optical attenuator coupled between said first and second segments of active optical fiber, said method comprising the steps of:

supplying a plurality of optical signals to said first segment of active optical fiber, each of said plurality of optical signals being at a respective one of a plurality of wavelengths;

measuring an input optical power associated with at least one of said plurality of optical signals supplied to said first segment of active optical fiber;

outputting said plurality of optical signals via said optical attenuator and said second segment of active optical fiber;

obtaining a predetermined attenuation value stored in a memory corresponding to said input optical power;

adjusting an attenuation of said optical attenuator based on said predetermined attenuation value such that an output power associated with each of said plurality of optical signals output from said optical amplifier is substantially the same.

13. A method for controlling an optical amplifier, said optical amplifier being configured to be coupled to an optical communication path having a first length, said optical amplifier comprising first and second segments of active optical fiber coupled in series by an intermediate optical path having a second length less than said first length, and an optical attenuator coupled between said first and second segments of active optical fiber, said method comprising the steps of:

supplying a plurality of optical signals to said first segment of active optical fiber, each of said plurality of optical signals being at a respective one of a plurality of wavelengths;

measuring an input optical power associated with at least one of said plurality of optical signals supplied to said first segment of active optical fiber;

comparing said input optical power with a predetermined power value;

outputting said plurality of optical signals via said optical attenuator and said second segment of active optical fiber;

adjusting an attenuation of said optical attenuator based on said comparison such that an output power associated with each of said plurality of optical signals output from said optical amplifier is substantially the same.

14. An optical amplifier comprising:

a first segment of active optical fiber having a first end portion coupled to an optical communication path having a first length, said optical communication path carrying a plurality of optical signals, each at a respective one of a plurality of wavelengths, and a second end portion, said first segment of active optical fiber receiving said plurality of optical signals through said first end portion and outputting said plurality of optical signals through said second end portion;

an intermediate optical path coupled to said second end portion of said first segment of active optical fiber, said intermediate optical path having a second length less than said first length;

an optical attenuator having an input port coupled to said intermediate optical path, said optical attenuator having a control port that receives an attenuation control signal, and an output port, said input port of said optical attenuator receiving said plurality of optical signals;

a second segment of active optical fiber having a first end portion coupled to said output port of said optical attenuator and a second end portion, said plurality of optical signals propagating through said optical attenuator and being supplied to said first end portion of said second segment of active optical fiber via said output port of said optical attenuator, said plurality of optical signals being output from said second segment of active optical fiber via said second end portion of said second segment of active optical fiber;

a first optical filter having an input port coupled to said second end portion of said first segment of active optical fiber and an output port coupled to said input port of said optical attenuator; and a second optical filter having an input port coupled to said output port of said optical attenuator and an output port coupled to said fist end portion of said second segment of active optical fiber.

15. An optical amplification device in accordance with claim 14, wherein said first optical filter includes an additional output port and said second optical filter includes an additional input port, said optical amplification device further comprising:

a service channel receiver coupled to said additional output port of said first optical filter, said service channel receiver sensing first optical service signals output from said additional output port of said first optical filter, said first optical service signals being at a wavelength different than said plurality of optical signals; and a service channel transmitter coupled to said additional input port of said second optical filter, said first optical service signals being output through said output port of said second optical filter to said first end portion of said second segment of active optical fiber.

* * * * *